Jan. 25, 1966 H. OHNEMUS 3,231,733
LIGHTING INSTALLATION FOR CARRIAGEWAYS
Filed April 10, 1963 10 Sheets-Sheet 1

INVENTOR.
Hans Ohnemus

Fig. 3

Jan. 25, 1966  H. OHNEMUS  3,231,733
LIGHTING INSTALLATION FOR CARRIAGEWAYS
Filed April 10, 1963  10 Sheets-Sheet 3

INVENTOR.
Hans Ohnemus

Jan. 25, 1966  H. OHNEMUS  3,231,733
LIGHTING INSTALLATION FOR CARRIAGEWAYS
Filed April 10, 1963  10 Sheets-Sheet 4

INVENTOR.
Hans Ohnemus

INVENTOR.
Hans Ohnemus

Jan. 25, 1966    H. OHNEMUS    3,231,733
LIGHTING INSTALLATION FOR CARRIAGEWAYS
Filed April 10, 1963    10 Sheets-Sheet 6

INVENTOR.
Hans Ohnemus

Jan. 25, 1966   H. OHNEMUS   3,231,733
LIGHTING INSTALLATION FOR CARRIAGEWAYS
Filed April 10, 1963   10 Sheets-Sheet 7

INVENTOR.
Hans Ohnemus

Jan. 25, 1966  H. OHNEMUS  3,231,733
LIGHTING INSTALLATION FOR CARRIAGEWAYS
Filed April 10, 1963  10 Sheets-Sheet 8

INVENTOR.
Hans Ohnemus

INVENTOR.
Hans Ohnemus

United States Patent Office 3,231,733
Patented Jan. 25, 1966

3,231,733
LIGHTING INSTALLATION FOR CARRIAGEWAYS
Hans Ohnemus, Traunreut, Upper Bavaria, Germany
(Johannesweg 12, 5021 Widdersdorf, Germany)
Filed Apr. 10, 1963, Ser. No. 272,060
Claims priority, application Germany, Apr. 21, 1962,
S 79,113, S 79,114
15 Claims. (Cl. 240—25)

The invention concerns a lighting installation for roads or streets with illuminating equipment arranged along at least one of the kerbs of carriage way the light-emitting openings whereof are all below the eye level of a vehicle driver and the principal direction of emission whereof is obliquely downwards against the direction of the traffic, each lighting unit being associated with means effectively screening it from the vehicle driver.

In known lighting installations of this kind the degree of illumination of the road or street obtained, is not in any economical ratio to the cost thereof.

The question is now, with the least expenditure of power and materials to obtain with illuminating installations of the kind described, a high and optimum degree of street illumination.

This purpose is achieved in the manner that according to the invention the principal direction of radiation A of each lighting appliance forms with the downward vertical thereto an angle $\alpha$ of the order of 85° and with the oppositely-running traffic direction V an angle $\beta$ of about 155° to 180°, each lighting appliance being associated with light-screening means arranged at a particular distance from the said appliance and effectively protecting a vehicle driver by which the light rays are substantially directed towards the lower edge and downwards.

The light-screening means consist of a screening shade arranged on the kerb at a distance $a$ from the lighting fitting and set about perpendicularly to the principal direction of radiation A, the distance $a$ being approximately equal to the product of the height $h$ of the light-emitting aperture and the tangent of the angle $\alpha$ ($a = h \cdot \tan \alpha$) and the lowest point of the light-emitting opening of the corresponding lighting fitting lying above a plane running through the lower edge of the screening shade and parallel to the surface of the street or road.

On the basis of the same principle the screening of the light can also consist of a screening strip arranged on the kerb and extending the length of the street or road, continuously or interruptedly, when again the lowest point of the light-emitting aperture of the corresponding lighting fitting is lying above a plane running through the lower edge of the screening strip. This arrangement is particularly suitable for the illumination of tunnels and the like.

In the following, exemplary forms of embodiment of the invention are described.

The accompanying drawing shows:

FIG. 14, a vertical cross-section through a tunnel with a lighting installation in accordance with the invention and bilateral arrangement of the lighting fittings in a continuous, downwardly open through.

In accordance with the invention the principal direction of radiation A (FIG. 4) of each lighting fitting 1 forms with a downward vertical thereto S, an angle of incidence of the light $\alpha$ preferentially of the order of 85°. With the opposite direction of running (meeting traffic) V (FIG. 3) A forms an angle $\beta$ of 155° to 170°; in particular circumstances up to 180° and more, especially with cast asphalt and asphalt-fine concrete covers. At the same time, the lighting fitting 1 is associated with a light screening means of high efficiency in the direction of a vehicle driver at which the light rays principally pass only at the lower edge and are directed downwards.

Figure 1:
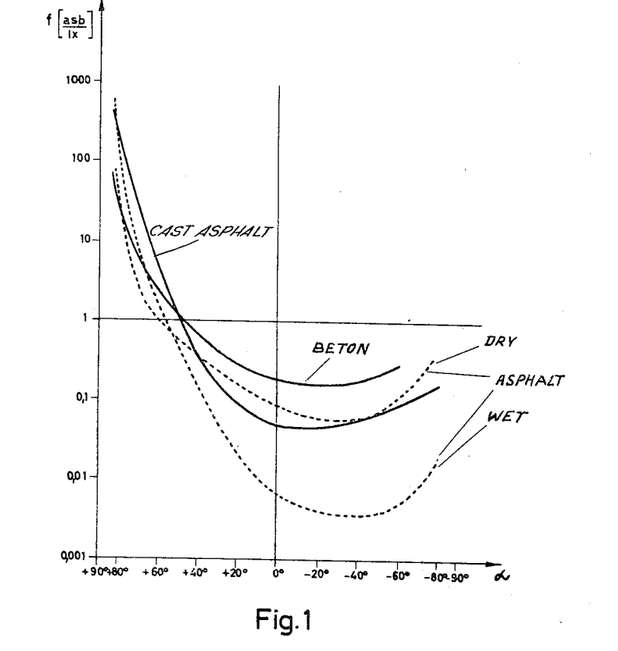
FIG. 1, a diagram of the relationship between the luminence factor and the angle of incidence of the light. For an asphalt surface (dotted), a curve for a dry and a curve for a wet surface, are shown.
Figure 2:
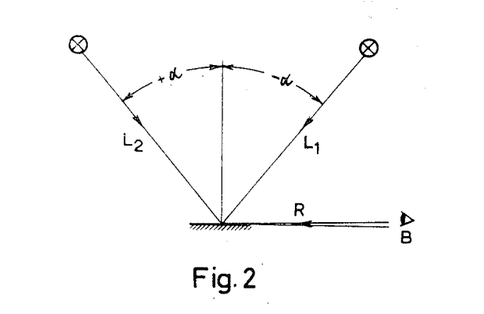
FIG. 2, a diagram of a positive and a negative angle of incidence of the light.

Examining in FIG. 1, the relationship between the luminence factor $f$ (measured in asb./lx.) and the angle of incidence of the light $\alpha$ it will be seen that it is by no means immaterial, whether with the same illumination intensity, the angle of incidence of the light is positive or negative (FIG. 2). It will be seen from FIG. 2, that the angle of incidence of light from the vertical, is negative for $-\alpha$, when it runs in the same direction (within the same quadrant) as the direction of observation R. Correspondingly, the positive angle of incidence of the light $+\alpha$ is the angle between the vertical and a direction of incidence of the light $L_2$, running oppositely to the direction of observation R.

Measurements on a test surface of cast asphalt have shown, that for angles of incidence $\alpha$ of the light between 0° and 60°, with an illumination intensity of 1 lx. a luminence of about 0.06 asb. is obtained. For the same intensity of illumination and an angle of +85° on the other hand, the intensity of illumination is about 500 asb., or 8,400 times. Cast asphalt as a road surface acts as a mat mirror of low reflectivity, i.e., the higher luminence degrees are obtained by glare reflexion. If there were no glare reflexion on cast asphalt, the luminence factor should be 0.06 asb./lx. at all angles, i.e., as for $\alpha=0°$. FIG. 1 also shows the behaviour of concrete. Concrete also exhibits glare reflexion, although not to the same extent as cast asphalt. When irradiated with an illumination intensity of 1 lx. and an angle of incidence of the light $\alpha$ of 0° to $-60°$ the intensity of illumination is about 0.2 asb. For $\alpha=+85°$ the luminence is about 70 asb., i.e. 350 times the comparative value. The values given, apply for worn concrete surfaces the surface grains whereof are no longer cement-coated, but so far run smooth that they glitter. New concrete surfaces show less glare and reflect more diffusely.

The higher reflecting power of a rain-wet asphalt surface is similarly represented in FIG. 1 (dotted lines). In the wet state, the luminence falls off rapidly with negative light incidence $\alpha$. At $\alpha=+85°$, luminence rises by another power of ten. The luminence of cast asphalt and concrete in rainy weather, will probably vary within the same order of magnitude.

The above considerations are the reason why in the lighting installation according to the invention, as much light as possible is thrown under the largest possible angle of incidence, against the direction of travel of the vehicle. In the case of the hitherto known, high-hung lights, owing to the dazzle effect on the vehicle driver, this effect cannot be utilised. In the lighting arrangement according to the invention, the danger of dazzle is avoided, firstly by arranging the apertures for the release of the light, below the eye-level of the vehicle driver; and secondly, by extremely sharp screening of the light rays above the horizontal, ensuring that no dazzling rays can escape. This strict screening cannot be attained by laminar screens arranged in the lengthwise direction of the lights alone. The difficulties arising in regard to screening are the reason why in known lighting arrangements with lights arranged approximately at eye level, their light radiation is principally directed in or across the direction of the traffic. It has already been pointed out, that with a negative angle of incidence of the light (principal radiation in the direction of the traffic), or in the case of light shining across the street, only very low luminence values of the street lights can be obtained, particularly in the case of cast-asphalt surfaces, and principally when these become wet.

In order to avoid moving shadows thrown by vehicles in motion, lighting fittings can advantageously be located on both sides of the street or road, at the kerbs, in such manner as to illuminate only about the adjacent half of the street. Lowering the lighting fittings to about 30–50 cm., can also avoid the formation of shadows, since the light rays then pass underneath the vehicles.

Light radiation in the direction of the traffic such as occurs with unilateral or bilateral illumination according to the invention, in streets with two-way traffic (direction of emitted light radiation as in FIGS. 15 and 17 for the lights 210), produces disturbing reflexions in rear-view mirrors and on windscreens of the vehicles. Since the outside mirrors of small cars are about 80 cm. above street level, it is in such case desirable to have the light emitted only at a level below 80 cm., by lighting fittings according to the invention, arranged along the kerb(s).

Figure 3:
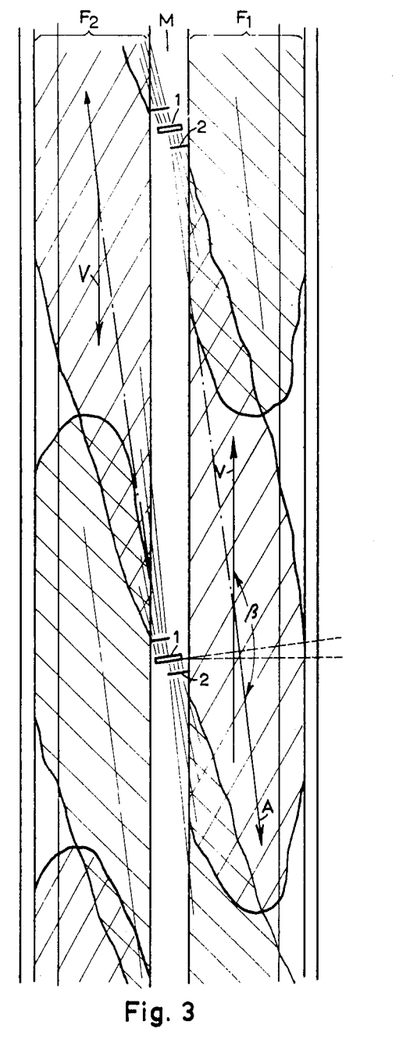
FIG. 3, a plan view of the lighting installation in accordance with the invention with lighting appliances fitted only on the central strip of a motorway.

The FIG. 3 shows a lighting installation for two carriageways $F_1$ and $F_2$ separated by a central strip M, with two-way traffic directions V. On the central strip M, lighting fittings 1 are arranged, the light-emitting apertures of which are all below the eye-level of a vehicle driver.

Figure 4:
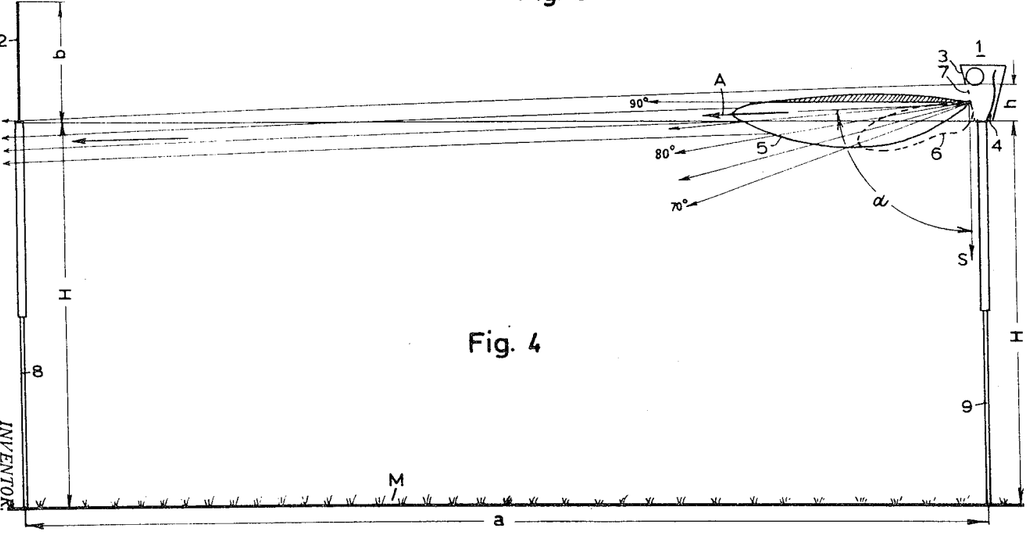
FIG. 4, a vertical longitudinal section through a unilaterally-radiating lighting appliance and an associated screening shade in accordance with FIG. 3.

FIG. 4 shows a vertical section along the principal direction of light radiation A according to FIG. 3. The lighting fitting 1 is suitably of extended form with the longitudinal axis extending horizontally in the form of a casing 3 containing elongated or point light sources. Elongated light sources can be, addition to phosphorescent (fluorescent) lamps, in particular tungsten-iodide lamps.

The latter have the advantage that they allow of excellent bundling or beaming of the light, and enable for the same height of emission the use of much smaller and neater forms of construction. In case of need the casing 3 can incorporate a light-beaming optical system, e.g. a reflector 4 and a slatted shutter. 5 shows a more favourable, 6 a less favourable curve of light distribution for the lighting fitting 1 (light-distribution curves of known types of hand lamps).

Figure 5:
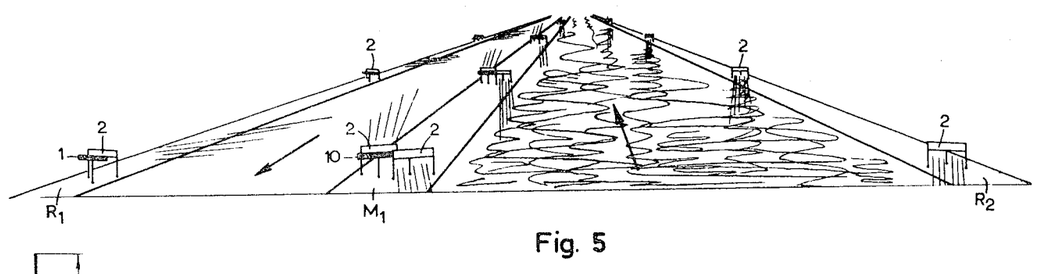
FIG. 5, a perspective view of a lighting installation in accordance with the invention with lighting appliances on the central strip and on both kerbs.
Figure 6:
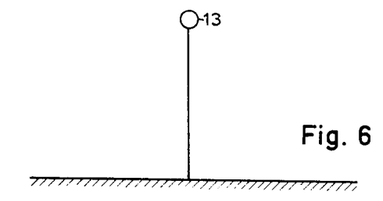
FIGS. 6 to 10, each, a view of a lighting appliance for a lighting installation in accordance with the invention having one or more separate lighting points for point light sources. The arrangement with respect to the screening shades is the same as in FIGS. 3–5 and 11–13.
Figure 7:
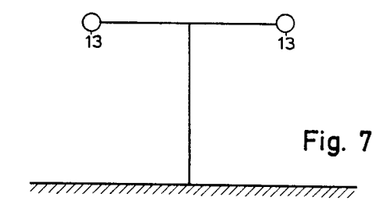
Figure 8:
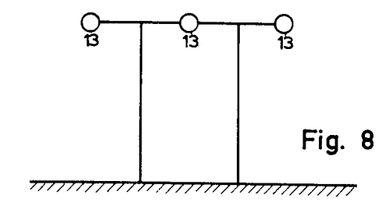
Figure 9:
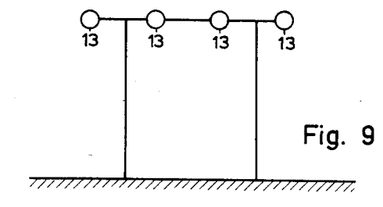
Figure 10:
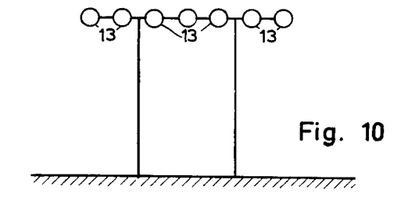

The peak of the light-distribution curve 5 is at an angle $\alpha$ of about 88°, in the case of the light-distribution curve 6, at about 70°. The light issuing above 90° from the lighting fitting 1, shown hatched on the drawing, is intercepted by the screening shade 2. The light-emission aperture 7 located at a height H above ground level, of the lighting fitting 1, is turned to face the driver of a vehicle and has a vertical height $h$. The distance $a$ (FIG. 4) between the lighting fitting 1 and the shade 2, is to be calculated by the formula:

$$a = h \cdot \tan \alpha$$

where $\alpha$ is the angle at which the light is to be radiated from the shade without weakening; in FIG. 5 this has been calculated at 88°. This formula is correct also for the smaller values of $a$ and $h$ occurring when tungsten-iodide lamps are used.

For instance:

For $\alpha=88°$, tan$=28.6$
For $\alpha=85°$, tan$=11.4$
For $\alpha=80°$, tan$= 5.7$ I.e., in the lighting installation according to the invention, $a$ is always several times greater than $h$ (in general, at least ten times greater).

For $\alpha=88°$ (light distribution curve 5, FIG. 4) and an emission height of 1 metre, the maximum light radiation emitted, strikes the street surface at 28.6 metres distance from the lighting fitting 1. The light issuing between $\alpha=0°$ and $+70°$, strikes the ground at a distance of 2.7 metres from the lighting fitting, i.e. in practice still falls on the verge or central strip of the road.

Every horizontal line within the limits of the light-emitting aperture 7 is nearly perpendicular to the principal direction of radiation A. It is advantageous if the screening shade 2 is also placed nearly perpendicularly to the principal of radiation A. A suitable screening shade 2 (FIG. 4) has the form of a plate arranged separately from the lighting fitting 1, and carried on height-adjustable feet 8. The lighting fitting 1 itself, can also be set on height-adjustable feet 9. In the exemplary form of embodiment shown in FIG. 4, the height H of the feet 8, 9 is identical, and may amount, e.g., to 0.95 metre. For a distance $a=1$–4 metres, the screening shade 2 has a height of 0.3 to 0.6 depending on the shape of the light-distribution curve. For tungsten-iodide lamps, where $a$ and $h$ are smaller, $b$ is likewise less (not represented). The screening shade 2 prevents light rays from being directed towards the vehicle driver at a greater height than 0.95 metre above street level.

FIG. 5 illustrates a motorway on which lighting fittings 1 are arranged both on the central strip $M_1$ and on both kerbs or verges $R_1$ and $R_2$. On the kerb $R_1$, the first lighting fitting 1 and its associated, separate screening shade 2, are clearly shown. At the kerb $R_2$, however, only the screening shades 2 are to be seen since the corresponding lighting fitting 1 are in the rear and thus obscured. Along the central strip $M_1$ lighting fittings 10 radiation in both traffic directions, are fitted, and associated with two screens 2, set up on opposite sides. Each lighting fitting 10 may itself consist of one or more individual lights 13 for point light sources (FIGS. 6–10), each being associated with a sharply-beaming optical system, such as a parabolic mirror. This enables particularly high degrees of luminence to be attained, since very little light is diffused sideways. On streets or roads which do not have a roughened surface, there is a danger in wet weather of undesirable increase in luminence, it being possible for strips of higher luminence to be formed, appearing to run towards the observer. In the case of the wider form of construction possible when fluorescent lights are used, the wider and less bright luminent strips overlap better, so that in this case, with a rain-wetted surface, the driver's view is not so impeded; visibility conditions are then better with illumination according to the present invention than with conventional forms of lighting.

Figure 11:
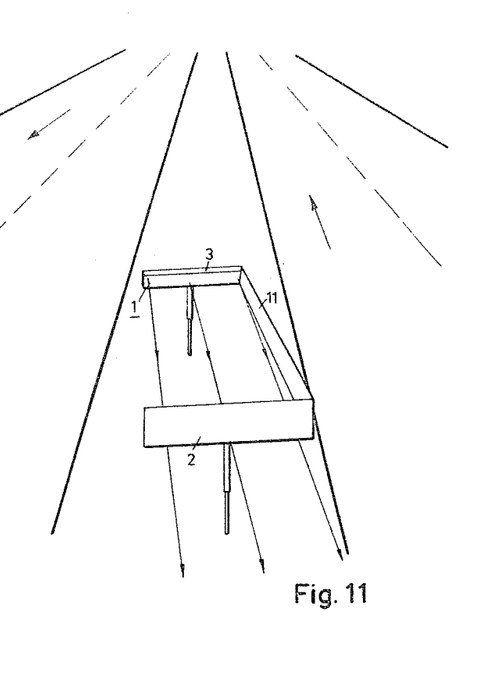
FIG. 11, a perspective view of a lighting installation in accordance with the invention using a side screen shade connecting a lighting fitting with the associated screening shade.

The casing 3 (FIG. 11) of the lighting fitting 1, and the associated screening shade 2, are suitably supplemented by one, or suitably two, additional side screens 11. FIG. 11 shows only one such side screen 11. It is also possible to have two, successive casings 3, of two lighting fittings 1, connected by one or two, side screens 11 (not represented). One of these side screens may suitably be made reflecting.

Figure 12:
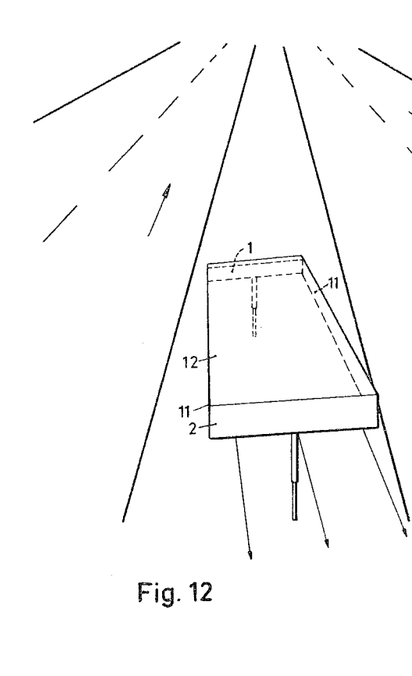
FIG. 12, an arrangement corresponding to FIG. 11 with a shutter.

It may further be advantageous, additionally to the screening shade 2 and the two, side screens 11, to provide a shutter 12 (FIG. 12), which prevents the exit of light rays upwards. This shutter 12, may have a reflecting under-surface. If a shutter 12 is provided, the reflector 4 may very simply be in the form of a parabolic trough and normal, low-radiating light distribution (for an approximately horizontal, principal direction of light radiation). If the shutter 12 is set obliquely, the screening shade 2 may wholly or partially be dispensed with, when the side screens 11 are made trapezoidal or triangular; since then, the shutter 12 if suitably sloped or inclined, undertakes the screening of the emitted light, together with the side screens 11 (not shown).

Figure 13:
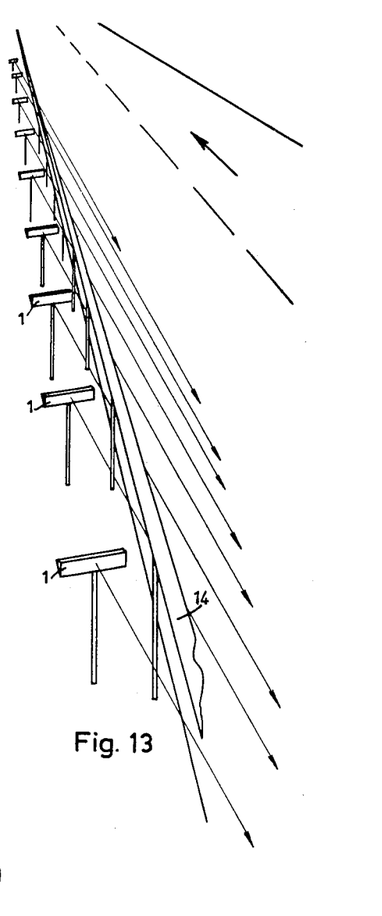
FIG. 13, a perspective view of a lighting installation in accordance with the invention with a screening strip running in the longitudinal direction of the street or road.
Figure 14:
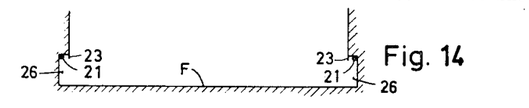

Advantageously, the screening shade 14 (FIG. 13) is arranged on the kerb equipped with lighting units 1 parallel to the longitudinal axis of the carriageway, in the form of a continuous strip. This form of arrangement is particularly suitable for lighting bridges, flyunders, and crossings of raised roadways. In such case, from considerations of space, short lighting fittings 1 are used, with short, fluorescent lamps, or tungsten iodide lamps.

In the FIGURES 14–28 the lighting units 21 are arranged in downwardly open channels 40 the edges 23 (FIG. 21) whereof are arranged approximately at the lowest point 24 of the light-emitting aperture 25 of the lighting fitting 21. The advantages of this form of embodiment of a lighting fitting in accordance with the invention are, that the lighting equipment is arranged in a common holding element, which, particularly in the case of a new installation, e.g. when made in concrete, can be easily and cheaply produced. Thus, in a tunnel, longitudinal grooves can be provided, the upper part of which is channel-shaped. Otherwise, a naturally, present (on bridges and viaducts) or specially arranged railing for the lighting equipment, is made to carry such a channel. This common channel can not only be used to carry and protect lighting units from the weather and dirt, but also affords in the simplest manner, perfect shielding or screening of the lighting fittings.

Figure 15:
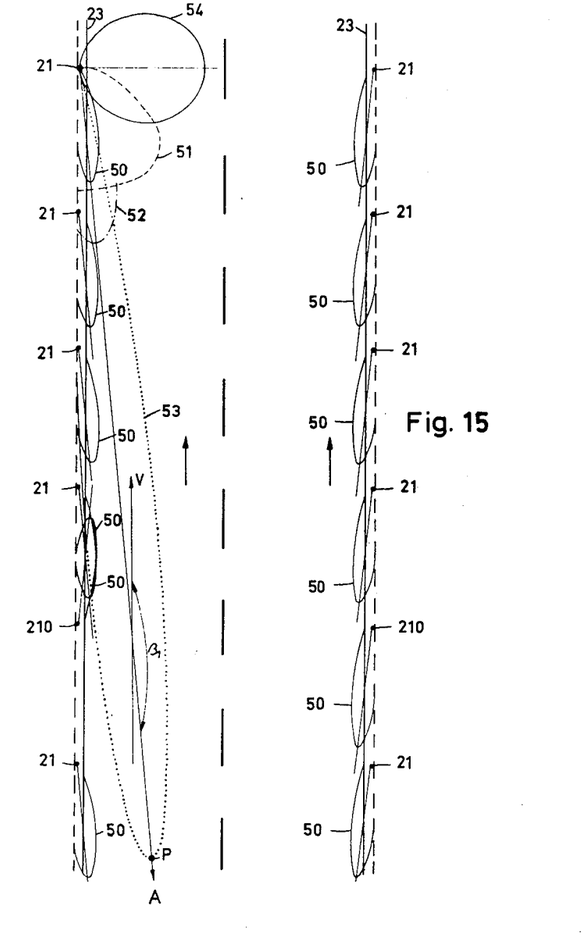
FIG. 15, a plan view of the arrangement according to FIG. 14.
Figure 16:
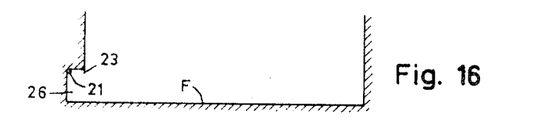
FIG. 16, a section corresponding to FIG. 14 of a unilateral arrangement of the lighting fittings.
Figure 17:
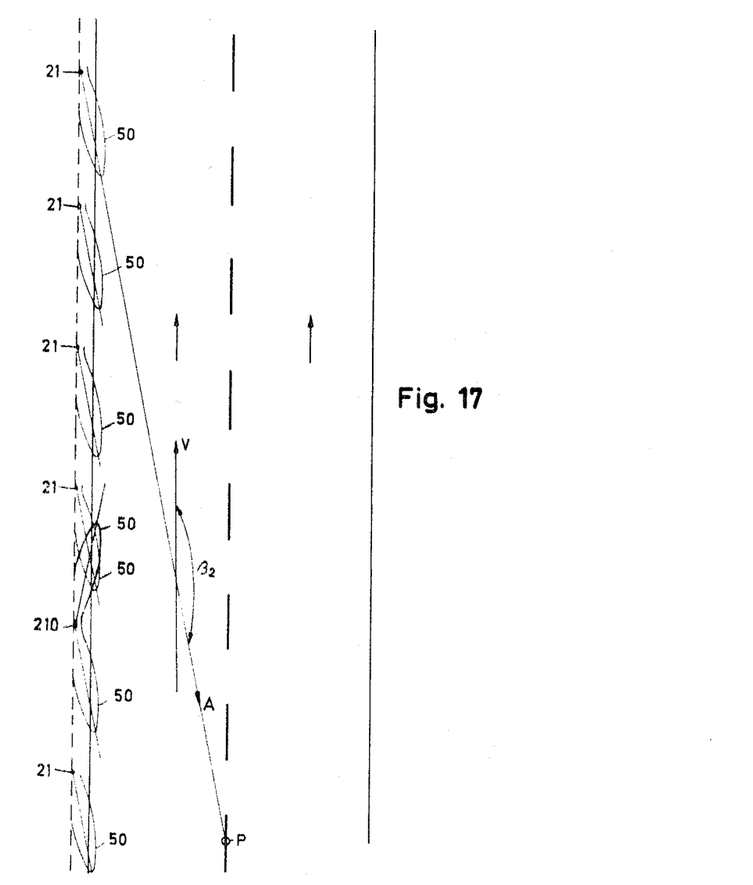
FIG. 17, a plan view of the arrangement according to FIG. 16.

The lighting equipment shown in FIGS. 14–17 is intended for lighting the roadway in a tunnel. In the exemplary form of embodiment according to FIGS. 14 and 15, lighting units 21 are arranged on both kerbs of the roadway. FIGS. 16 and 17 refer to a tunnel with lighting means 21 arranged along one kerb only, the channel being suitably made somewhat broader. The lowest point 24 of the light emitting aperture 25 (FIG. 21) of the lighting fitting 21 is in all cases below the eye of a vehicle driver.

The lighting units 210 in FIGS. 15 and 17 have their light-emitting apertures arranged for meeting traffic. In FIG. 15 the light radiation on the right-hand kerb is retained. On the lefthand kerb it is reversed, and beamed against the opposite traffic direction. In FIG. 16, two lights 210, instead of one light 21, are installed, or a single, but double-acting light point, suitably with a beaming optical system of lenses and prisms, must be fitted, in order that light may be beamed against both directions of traffic.

Exactly in the same manner, the light-emitting arrangements must also be modified in FIGS. 3, 5, 11, 12, 13, if the individual lanes are intended for opposite traffic directions or when as in FIGS. 3, 5, 11 and 12, the one traffic lane is closed and the opposite lane must receive two-way traffic for any considerable time. In the case of one-way operation, structural optical or mechanical means for aiding such a reversal of the lighting arrangements for oppositely-directed traffic, will be found advantageous.

The channel wall bounded by the channel edge or rim 23 (FIG. 21), suitably a longitudinally-extending wall, forms a screening strip 23' running along the roadway edge and acts as a light screen for the vehicle driver. The light-emitting aperture 25 (FIGS. 21 and 18) of the lighting fitting 21 stands nearly perpendicularly to the principal direction of light emission A, or lies in a plane perpendicular to the roadway F.

The channel 40 is suitably made part of a continuous wall recess 26. In the new construction of a tunnel or a bridge, this wall groove 26 can be arranged for simultaneously with the channel 40. In this case, the bottom 27 (FIG. 21) of the wall recess 26 may be arranged below the level of the roadway F, thus forming a gutter 28. This gutter is arranged to receive service conduits for water, fresh air, electric current and telephone cables, and can also accommodate drainage devices.

The lighting fittings are suitably arranged to receive point sources or nearly point sources of light, intensive optical beaming being obtained by means of reflectors (suitably of the parabolic type), or by lenses etc.

The light distribution curves for all lighting fittings 21 shown by the full lines 50 (FIGS. 15, 17) in each case refer to a reflector glow lamp of 100 w./220 v. (This lamp has a high, directional effect, so that in the lighting installation according to the invention the disadvantages of a lower light yield with respect to a gas discharge lamp by a fewer scattering can be compensated.) A mercury-vapour, high-pressure reflector lamp with a fluorescent medium of 250 watts power, shows the light distribution curve represented by the broken line 51 (FIG. 15). The broken line light-distribution curve 52 refers to a mercury-vapour high pressure lamp without fluorescent medium, which by its relatively small lighting element enables beaming of the light. With a luminence of the burner of 40 asb. and a parabolic projecting reflector of 12.5 cm. diameter, a maximum illumination of 3650 cd. is obtained, allowing a loss factor in the optical system of 0.75. The light-distribution curve 52 is shown only in part, since the degree of scattering depends on the lamp output and the form of reflector. With increasing output, only the scattering increases, but not the peak intensity of illumination, since the luminence of the burner is independent of the output. A value of 3650 cd. is already obtainable with a lamp output of 50 watts.

The light-distribution curve shown dotted 53 (FIG. 15) is obtained for a reflector lamp of 150 w./24 v., or a parabolic projector of 12.5 cm. diameter, equipped with a low-voltage glow lamp. The compact spiral of the lamp even furnishes a peak illuminating intensity of about 17,000 cd.

In FIGS. 14–17, the width of the carriage way is assumed to be 10 metres.

Figure 22:
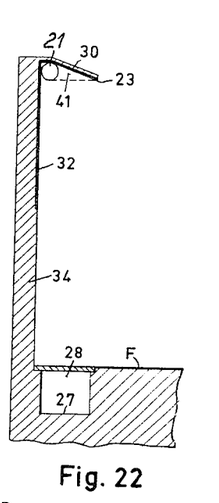
Figure 24:
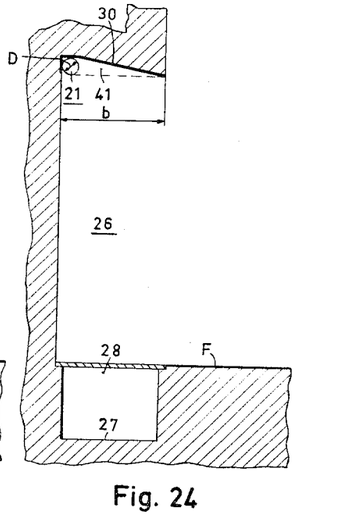
Figure 25:
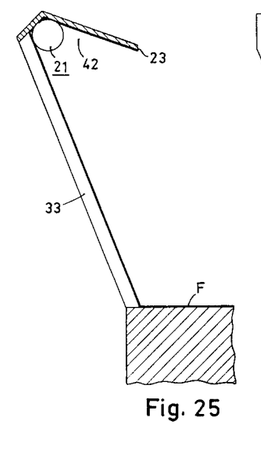
FIGS. 25 to 27, each a vertical cross-section of channels arranged on slanting attachments for a lighting installation according to the invention; and, FIG. 28, a vertical longitudinal section of the channel having a sawtooth-ceiling for a lighting installation in accordance with the invention.
Figure 26:
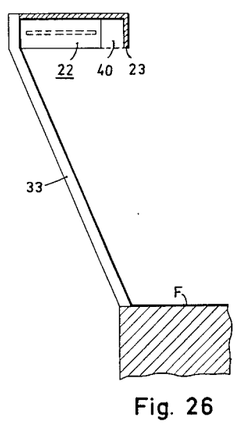
Figure 27:
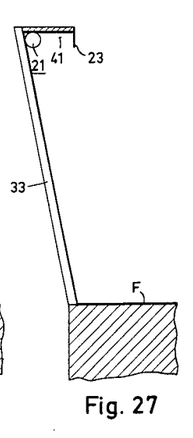
Figure 28:
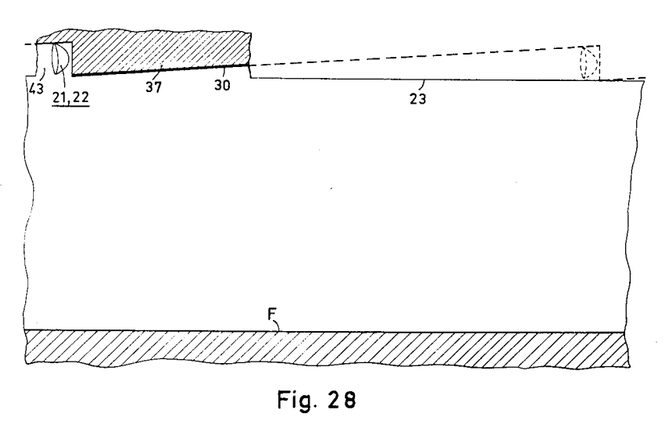

The principal direction of light radiation A encloses with the downward vertical, an angle $\alpha$ of about 88°, i.e., is 2° below the horizontal. For a lighting unit 21 arranged at 1 metre height, the maximum light intensity is at a point P (FIG. 15) at 28.6 metres distance on the carriageway F. If the angle $\beta_1=174.5°$, the point P is at the middle of the left-hand carriageway. In FIG. 17, for the same carriageway width and an angle $\beta_2=169°$, the point P is at about the middle of the carriageway, which is advantageous for one-sided illumination. This, however, increases the width of the recess; which can be explained as follows:

If the peak light intensity in the direction of the point P is to remain undiminished, the lighting fitting 21, locking from point P, should not be obscured by the edge 23 of the channel 40. For the distance $a'$ (FIG. 1) of the lowest point 24 of the light-emission aperture 25 of the lighting fitting 21, from the channel rim 23 (FIG. 21) we have the formula:

$$a' = D \cdot \sin(180° - \beta) \cdot \tan \alpha$$

where D is the diameter of the light-emission aperture 25 of the lighting fitting 21. For the case of FIG. 15, $a'=2.74D$ and, for FIG. 17, $a'=5.5D$. The total width b of the channel 40 is in all cases, $a'+D/2$. For a value of $D=12.5$ cm. with the lighting fittings 21 arranged on both sides according to FIG. 15, the distance $a'=35$ cm.; for unilateral arrangement according to FIG. 17, $a'=68$ cm. If the channel 40 is to be made smaller, the diameter of the lighting fitting 21 must be correspondingly less (FIGS. 22, 24, 27). For $D=6.7$ cm., double the number of lighting fittings 21 must be provided. In such case, the illumination intensities, taken as a whole, must decrease to one half, corresponding to the reduction in the diameter of the reflectors, despite the doubling of the number of lights. This makes it possible to decrease the luminence of a street if its road covering, for instance a smooth, cast-asphalt roadway, would otherwise have an excessive luminence. The uniformity of illumination is also improved, especially in wet weather and for shiny road surfaces. In FIGURES 15 and 17 the distance of the lighting fitting 21 from each other is chosen 5 metres.

Figure 23:
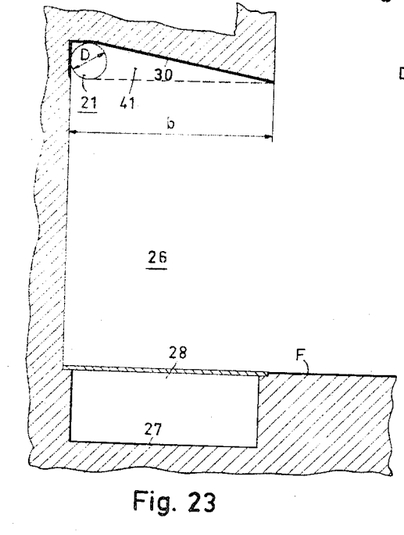

The channel for the lighting fittings can be of various cross-section. These cross-sections can be bounded by straight lines. More suitably, the channel cross-section is wholly or partially bounded by curved lines (not represented). The channel 40 shown in FIG. 21 has a rectangular cross-section. The inside height 41 of the channel is suitably made to decrease towards its free rim (FIGS. 20, 22), producing a tapering cross-section. This can either be trapezoidal (FIGS. 23, 24), or triangular (not shown). In FIGS. 23 and 24 the wall recesses 26 in a tunnel, are shown, which are equipped with lighting fittings 21 of different sizes arranged along only one kerb, for which reason the niches are deeper, or the channel wider, respectively.

All or individual side walls of the channel 40, 41, are suitably provided wholly or partly with a reflecting coating 30. Such a reflecting coating 31 can also be most advantageously fitted on the wall extending below the channel 40 (FIG. 21), continuing downwards, suitably as far as the level of the road surface F. These reflecting coatings 30, 31, 32 are most suitably made of a light, mat or bright paint, light-coloured tiles, a reflecting aluminum foil, or the like. The coatings 30, 31, 32 cause the incident light intensities to be reflected and are capable of considerably increasing the intensity of illumination in the direction of the point P on the roadway F. The coatings 30, 31, 32 act as reflectors of very great focal length, attention being paid to the possibility of multiple reflexion.

If a vehicle driver sees the point P about 50 or 100 metres ahead, i.e. practically in a direction parallel to the road surface, he receives the greatest degree of luminence (brightness) if the lighting unit lies in the direction of viewing (reflexion law). The requirement of the least possible lateral deviation of the rays coming flat towards the observer, is to be particularly strictly observed in the case of smooth, cast asphalt. In the system of lighting according to the invention, street luminence is nearly exclusively provided by the light rays lying within the range $180° > \beta > 160°$; the remaining regions contribute practically nothing to the luminence of the street.

In the case of a cast asphalt road covering the lighting system according to the invention produces, on a reference section, compared with a 5-metre handrail light with 210 watts rated power (light-distribution curve 54 in FIG. 15), for instance with a 100-watt/220 v. lamp, about eight times the degree of luminence on the road, using a 50-watt mercury-vapour high-pressure lamp without fluorescent medium, about twelve times, and for a 150-watt/24 v. reflector glow lamp, about 50 times the luminence. According to the invention, therefore, the highest degree of luminescence on the road with the minimum requirement of lighting current and energy.

The visibility of even small objects is in the case of the lighting system according to the invention excellent: no "dead patches" are formed, in which objects of a particular degree of reflexion are badly or not at all perceptible. Each object is plainly visible in silhouette: it appears in the lighting system according to the invention as a black shadow-figure on a light background of the road surface (negative contrast) since the object is not illuminated from the observer's side, i.e. is not brightened.

Figure 18:
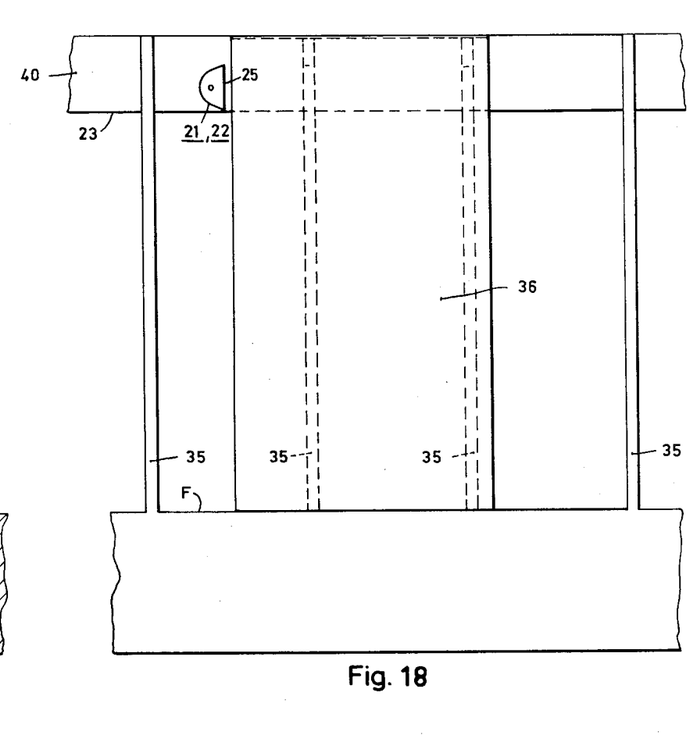
FIG. 18, a view of a lighting installation with a channel arranged along a handrail (locking from outside the railing).
Figure 19:
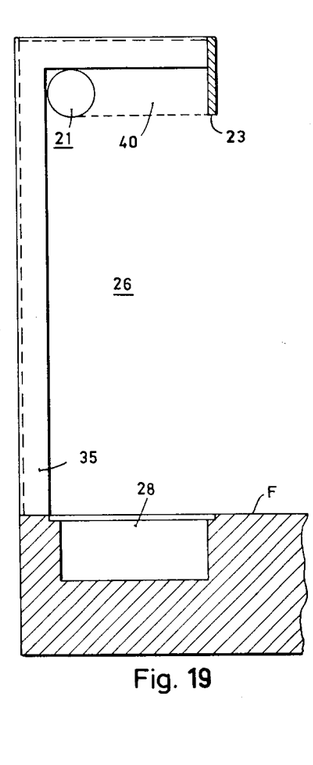
FIG. 19, a vertical cross-section of the arrangement according to FIG. 18.
Figure 20:
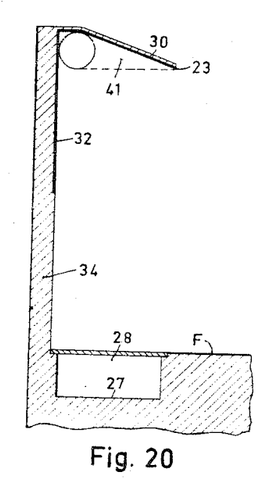
FIGS. 20 to 24, each a vertical cross-section of differently shaped channels of a lighting installation in accordance with the invention.
Figure 21:
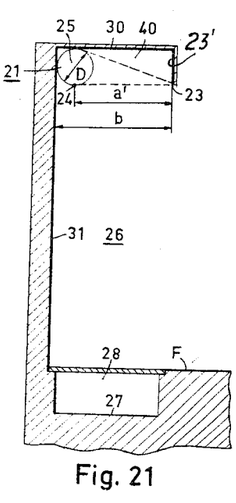

FIGS. 20 and 22 show, for a lighting system according to the invention with bilaterally-located lightings 21 according to FIG. 15, for a bridge or viaduct, a parapet 34, supporting the channel. In this case, the relationship between the size of the channel 41 and the diameter D of the light-emitting aperture 25 of the lighting fitting 21, is plainly to be seen. A reflecting coating 32 extends over a part of the parapet 34 downwards. FIGS. 18 and 19 show the lighting system according to the invention with the lighting units 21 arranged in a channel 40, carried on the stanchions 35 of a handrail, such as may be fitted to a bridge or viaduct. Each light-emitting aperture 25 of a lighting fitting 21 is here advantageously fitted with a screen 36 (FIG. 18) acting as a dazzle-shield for drivers below railing level. This shield 36 thus extends the length of the railing, suitably in the form of a flat sheet, of metal or other suitable material. It is advantageous, however, to extend the sheet only until the shutter (louvre) effect of the rail stanchions themselves serves to screen the light.

In the exemplary forms of embodiment hitherto described, the lighting fitting 21 is in all cases equipped with a point source of light. The lighting fitting 22 (FIGS. 26, 18, 28) is suitably adapted to carry an oblong source of light, specifically, a luminescence lamp of short structural length. A tungsten-iodide glow lamp, can also act as an extended source of light, whereby the channel becomes particularly slim and flat in profile. The lighting fitting 22 according to FIG. 26, contains a beaming optical system, for instance a troughed mirror or a cylindrical lens.

In all the channels shown, of a lighting system according to the invention (FIGS. 14–28), lamps with elongated light sources can be fitted, particularly simply in the rectangular channels (FIGS. 14, 16, 19, 21, 26, 27). Lamps for point light sources are also advantageous when associated with an oblong light-emission opening e.g. a cutting out of a parabolic mirror or a stepped lens, etc.

A wall leaning outwards from the roadway F, 33, can suitably be fitted with a channel 40, 41 or 42 (FIGS. 25–27), receiving the lighting fittings 21 or 22. This enables the full width of the bridge to be used for the roadway and/or a footpath. The channel 42 (FIG. 25) has a triangular cross-section.

The bottom 37 (FIG. 28) of a channel 43 can suitably be drawn downwards between each two lighting fittings 21 or 22, viewed in the direction of light-emission, about to the level of the rim 23 of the channel. This bottom 37 can also be equipped with a reflecting coating 30; making the bottom of this channel 43, saw-toothed.

What I claim is:

1. In a lighting system for carriageways, a plurality of light housings arranged along a curb of the carriageway, said housings containing light sources therein and light emitting openings, said openings located at a predetermined height above the carriageway so that said openings are positioned below the eye-level of an average driver of a vehicle, means for directing the light emission through said openings obliquely downwards toward the oncoming traffic and principally under an angle of approximately 85° with respect to a perpendicular extending downward from the light housing and forming with the oncoming traffic direction an angle β of about 155° to 180°, a screening means associated with each of said light housings, located at a predetermined distance from said light housing, and at a predetermined height from the carriageway level for effectively shielding the driver's eyes from direct light, the light rays passing only below the lower edge of said screening means in a downwardly inclined direction.

2. In a lighting system according to claim 1, said screening means consisting of a screening shade located nearly perpendicularly to the direction of principal light emission, said distance $a$ between said screening shade and said light housings approximately equalling the product of the height $h$ of said light emitting opening and the tangent of the angle $\alpha$ between said principal direction of the light rays with said perpendicular ($a = h \cdot \tan \alpha$), the lowest point of said light emitting opening lying above a plane parallel to the carriageway surface.

3. In a lighting system according to claim 1, said screening means consisting of a screening strip running along the curb of the carriageway, the lowermost point of said light emission openings of the appertaining light houses being located above a plane parallel to the carriageway surface and running through the lower edge of said screening strip.

4. In a lighting system according to claim 1, said screening means consisting of a screening strip running along the carriageway at the curb, a channel open at the bottom receiving said light housings the carriageway side wall of which forming said screening strip, and a longitudinal structure erected along said kerb carrying said channel.

5. In a lighting system according to claim 1, said screening means consisting of a screening strip running along the carriageway at said kerb, the lowest point of said light emission opening having the diameter D forming a distance $a'$ from the lower rim of said screening strip approximately corresponding to the formula $a' = D \cdot \sin(180° - \beta) \cdot \tan \alpha$.

6. In a lighting system according to claim 1, a channel open at the bottom running along the carriageway and receiving said light housings, a longitudinal structure erected along said curb and carrying said channel, light directing means arranged at said channel, said longitudinal structure being adapted for projecting portions of the light rays and of the scattering light on to parts of the carriageway.

7. In a lighting system according to claim 1 being applied to a tunnel, a channel open at the bottom running along the carriageway and receiving said light housings, a longitudinal structure erected along said curb, carrying said channel, light directing means arranged at said channel, said longitudinal structure being adapted for projecting portions of the light on to the upper wall of said tunnel.

8. In a lighting system according to claim 1, a channel open at the bottom running along the carriageway and receiving said light housings, a longitudinal structure erected along said curb carrying said channel, reflecting coatings on parts of the longitudinal walls of the channel and of the longitudinal structure for projecting portions of the light on to parts of the carriageway.

9. In a lighting system according to claim 1, a channel open at the bottom running along the carriageway, the surfaces of said channel being in part formed irregularly and interruptedly.

10. In a lighting system according to claim 1, said screening means consisting of a screening shade, side screens and a shutter arranged between said light housing and the associated screening shade for preventing exit of scattering light rays upwardly and sideways.

11. In a lighting system according to claim 1, said screening means consisting of side screens and a shutter running from the lighting fitting for preventing exit of scattering light rays, said shutter being downwardly inclined and the longitudinal edges of the side screens being correspondingly convergent, whereby other screening means can be saved.

12. In a lighting system according to claim 1, said screening means consisting of a screening strip running along the carriageway at the curb, a channel open at the bottom, receiving said light housings, a reflecting coating of the inner surfaces of said channel, and means for extending the angle β to 180° and more.

13. In a lighting system according to claim 1, said screening means consisting of a screening strip running along the carriageway at the curb, a channel open at the bottom, receiving said light housings, the inside height of the channel decreasing in the direction towards the carriageway side of the channel.

14. In a lighting system according to claim 1, the individual lamps of the light housings having means for reducing their light emission above their middle horizontal plane and enhancing it below this plane.

15. In a lighting system according to claim 1, said carriageway having a cover of cast-asphalt or asphalt-fine concrete, and means for restricting the angle β between the principal direction of light emission and the oppositely running traffic from 170° to 180°.

References Cited by the Examiner

UNITED STATES PATENTS 2,270,474  1/1942  Recher ____________ 240—25
3,004,145  10/1961  Kroes _____________ 240—25

FOREIGN PATENTS 893,103  4/1962  Great Britain.

NORTON ANSHER, *Primary Examiner.*